United States Patent [19]

Atkins et al.

[11] Patent Number: 4,678,711

[45] Date of Patent: Jul. 7, 1987

[54] PROCESS FOR PROMOTING THE ADHESION OF EPOXY BONDED FIBER REINFORCED PLASTICS

[75] Inventors: Kenneth E. Atkins, South Charleston; Raymond C. Gandy, St. Albans; William A. Larck, Scott Depot, all of W. Va.

[73] Assignee: Union Carbide Corporation, Danbury, Conn.

[21] Appl. No.: 783,535

[22] Filed: Oct. 3, 1985

[51] Int. Cl.$^4$ .......................... B32B 25/38; C09J 5/04
[52] U.S. Cl. .................................... 428/414; 156/182; 156/307.5; 156/315; 156/330; 428/302
[58] Field of Search ...................... 156/182, 315, 307.5, 156/330; 428/302, 414; 524/560

[56] References Cited

U.S. PATENT DOCUMENTS

| Re. 31,975 | 8/1985 | Comstock et al. | 523/514 |
|---|---|---|---|
| 3,431,157 | 3/1969 | Mack | 156/182 |
| 3,799,832 | 3/1974 | Reick | 428/414 |
| 3,847,855 | 11/1974 | Dawson | 524/777 |
| 4,130,523 | 12/1978 | Hoy et al. | 523/305 |
| 4,316,830 | 2/1982 | Mallon | 524/339 |
| 4,374,215 | 2/1983 | Atkins | 523/514 |
| 4,482,604 | 11/1984 | Donermeyer et al. | 428/414 |
| 4,491,642 | 1/1985 | Atkins | 523/515 |
| 4,525,498 | 6/1985 | Atkins et al. | 523/511 |
| 4,544,432 | 10/1985 | Foister et al. | 156/315 |

OTHER PUBLICATIONS

Kirk-Othmer, Encyclopedia of Chemical Technology, Third Ed., vol. 18, Wiley Interscience, pp. 590-591.
Fusor TM 310, Product Literature from Lord Chemical Products.
UCAR ® Latex 879, Product literature from Union Carbide Corp.
UCAR ® Latex 163, product literature from Union Carbide Corp.
UCAR ® Latex 123, product literature from Union Carbide Corp.
UCAR ® Latex 874, product literature from Union Carbide Corp.
UCAR ® Acrylics, Latexes, and Vehicles, product literature from Union Carbide Corp.
UCAR ® Latex 154, product literature from Union Carbide Corp.

Primary Examiner—John J. Gallagher
Attorney, Agent, or Firm—S. H. Flynn

[57] ABSTRACT

Articles manufactured by bonding two or more shaped fiber reinforced polymeric substrates together can be made by an improved process comprising:

applying a self-crosslinking acrylic polymer latex primer to the bonding surface of each of said substrates and allowing said primer to dry, applying an epxoxy adhesive, in an amount sufficient to effect adhesion, to the bonding surfaces thus primed, and contacting the bonding surfaces thus primed and epoxied with one another, under conditions sufficient to cure the epoxy, to achieve bonding.

22 Claims, No Drawings

PROCESS FOR PROMOTING THE ADHESION OF EPOXY BONDED FIBER REINFORCED PLASTICS

FIELD OF THE INVENTION

This invention relates to an improved process for bonding together fiber reinforced plastic substrates by means of epoxy adhesives. The invention further relates to articles of manufacture comprising the fiber reinforced substrates thus bonded.

BACKGROUND OF THE INVENTION

Fiber reinforced plastics are a broad class of thermoplastic and thermosetting resins characterized by their strength, corrosion resistance, good dielectric properties and moldability. Sheet molding compounds (SMC) are a subclass of fiber reinforced plastics which are widely used in the manufacture of reinforced plastic products such as automobile parts, particularly in the area of automotive exterior skin applications to reduce the weight of components such as grill-opening panels, fenders, decklids, hoods, and door skins (Kirk-Othmer, *Encyclopedia of Chemical Technology*, Third Ed., volume 18, Wiley Interscience, p. 590). SMCs also have applications in power-tool housings, business machine components, shower stalls, and so forth.

Typical SMC formulations generally contain an unsaturated polyester, styrene, a low profile additive, thickening agent and various additives and fillers. When used in a weight reducing application, SMC parts are molded as two rigid pieces, a smooth surface plastic skin and a reinforcing base plastic member. The skin is then bonded to the reinforcing member with a suitable adhesive and baked to cure to form the finished part. Until comparatively recently, urethane based adhesives were the adhesives of choice in the automotive industry to bond SMC pieces when forming SMC parts.

Much attention is now being focused, however, on electrocoating paint processes in automotive assembly line operations which require process temperatures generally in excess of the decomposition temperature of most urethane adhesives. In an electrocoating process, an electrical charge is applied to an assembly unit to be primed. The charged unit is coated with pigment by submerging in a bath containing pigment particles which are oppositely charged. The assembly is then removed from the pigment bath and cured in a baking oven for a period of about 10 minutes to about 60 minutes at a temperature typically ranging between about 350° and about 450° F. Electrocoating is very desirable as an effective means of sealing undersurfaces and other areas not reached by conventional methods of paint application.

Urethane based bonding systems, however, typically decompose at temperatures ranging between about 250° F. and about 350° F., and can thus show extensive adhesive failure when exposed to electrocoating process temperatures used to make painted SMC parts. Accordingly, researchers have developed bonding systems capable of withstanding the higher temperatures of these processes. Epoxy based adhesive systems in particular have been of considerable interest. Fusor ®310, available from Lord Corporation, Chemical Products Group, is an example of a commercially available temperature resistant epoxy bonding system which is marketed for use with SMC substrates and which presently appears to be enjoying increased use in the automotive industry.

Although epoxy based systems such as Fusor ®310 are able to withstand high electrocoating process temperatures without decomposing, until this invention substrates bonded with these systems required surface sanding or other means of abrasion in order to promote good adhesion consistently. Sanding is a relatively time consuming step in assembly line operations. The added time required to properly prepare substrate surfaces for bonding disadvantageously results in significantly higher manufacturing costs.

A process for bonding SMC substrates by means of a temperature resistant bonding system, which eliminated the need to abrade substrate surfaces in order to achieve good bonding, which thus be a useful addition to the SMC molding art and other arts requiring high temperature resistance of adhesively bonded polymer layer.

THE INVENTION

This invention provides an improved method of bonding two or more shaped polymer objects (herein also referred to as "substrates") such as an SMC skin and an SMC reinforcing member together, comprising:

applying a self-crosslinking acrylic polymer latex primer to the bonding surface of each of said objects and allowing said primer to dry, applying an epoxy adhesive, in an amount sufficient to effect adhesion, to the bonding surfaces thus primed, and contacting the bonding surfaces thus primed and epoxied with one another, under conditions sufficient to cure the epoxy, to effect bonding.

"Bonding surface" refers, of course, to the surface areas of the polymer objects which are in actual contact once bonded. It is thus only the bonding surfaces which need to be primed and epoxied.

"Epoxy" is used in its conventional art-accepted sense to denote that class of thermosetting resins formed by curing a polyepoxide compound with one or a mixture of aliphatic or aromatic polyamine hardeners. Suitable polyamine hardeners are polyalkylene polyamines such as diethylene triamine, triethylene tetraamine, and tetraethylene pentaamine. A preferred polyepoxide for use with such hardeners is a diepoxide formed, for example, by reacting epichlorohydrin with bisphenol-A to form the bisphenol-A diglycidyl ether, although substantially any epoxy bonding system suitable for use with fiber reinforced plastics and capable of withstanding temperatures of at least about 350° F. to about 450° C. is suitable for use herein. Illustrative of such a system is the aforementioned Fusor ®310, available from the Lord Corporation. The epoxy may or may not contain fillers such as talc or silica to reduce economics, as desired.

The invention is particularly contemplated for use in the automobile industry when bonding SMC skins and reinforcing members to form automobile parts, although the invention is not limited in utility to the bonding of SMC substrates, but rather is broadly applicable to the bonding of fiber reinforced plastic substrates regardless of method of preparation such as BMC, transfer molding, injection molding, and so forth.

The latex primers suitable for use herein are self-crosslinking acrylic polymer latexes having a solids content of from about 40 to about 60 volume percent in a water base. The latexes are produced by emulsion polymerizing lower alkyl acrylates such as ethyl acrylate, butyl acrylate, isobutyl acrylate, methyl methacrylate, and hydroxyethyl acrylate with other monomers such as:

vinyl esters of lower aliphatic acids such as vinyl acetate;

ethylenically unsaturated carboxylic acids, having from 2 to 6 carbon atoms such as acrylic acid, methacrylic acid, and itaconic acid;

monoethylenically unsaturated monomers having from 2 to 8 carbon atoms such as styrene and vinyl chloride;

unsaturated amides such as N-methylolacrylamide, acrylonitrile and acetoacrylamide.

The latexes may also contain surfactant levels of from about 0.0 to about 0.4% by weight based on the total weight of the solid components.

Preferred latexes are ethyl acrylate/acrylonitrile copolymers which contain from about 30 to about 95% of ethyl acrylate; from about 2 to about 40% of acrylonitrile; from about 0 to about 68% of butyl acrylate; from about 0 to about 68% of isobutyl acrylate; from about 0 to about 60% of methylmethacrylate; from about 0 to about 50% of 2-ethylhexyl acrylate; from about 0 to about 50% of vinyl acetate; from about 0 to about 10% N-methylolacrylamide; from about 0 to about 50% styrene, from about 0 to about 5% of acrylic acid; from about 0 to about 5% of methyl acrylic acid; and from about 0 to about 5% of itaconic acid, wherein all percentages are by weight based on the total weight of the solid components. Particularly preferred are acrylate/acrylonitrile latexes containing from about 55 to about 85% of ethyl acrylate; from about 2 to about 15% of acrylonitrile; from about 0 to about 15% of 2-ethyl hexyl acrylate; from about 0 to about 25% of styrene; from about 1 to about 3% of an ethylenically unsaturated carboxylic acid selected from the group consisting of acrylic acid, methyl acrylic acid and itaconic acid, and from about 1 to about 4% of N-methylolacrylamide. Examples of commercially available latexes suitable for use herein are those available under the trade designations Latex 879, Latex 872 (also available as Latex 163) and Latex 874 (also available as Latex 154) produced by Union Carbide Corporation.

The bonding systems of this invention may be used with a variety of fiber filled plastics including those SMC substrates containing as low profile additives Neulon-A, Neulon-S and Neulon-T, available from Union Carbide Corporation; DSM 730 and 780 available from Budd; XPL 1054 R65, ITP 1054 R50 F25 and ITP 1054 R65 available from ICI; Derakane 790 available from Dow Chemical Co.; 9628 available from USS Chemicals; Phase Alpha available from Ashland Chemical; and 7101 and 7019 available from Diversitech General.

The process of this invention involves applying a self-crosslinking acrylic polymer latex primer to the surfaces of the fiber reinforced substrates to be bonded by conventional applicate means (e.g., wiping, spraying, painting, and so forth), preferably such that a coating having a thickness less than about 15.0 mils, more preferably less than 10.0 mils, and most preferably between about 0.25 and about 5.0 mils, is deposited on said surfaces. The primer is permitted to dry (typically at room temperature) for a period sufficient to allow the primer solvent (e.g., water) to evaporate and the primer to set up as a film. The minimum drying period will generally range between at least about 1 and about 5 minutes, the maximum drying period being as long as desired. An epoxy adhesive suitable for use with the fiber reinforced substrates is applied to the bonding surfaces thereof in an amount sufficient to achieve bonding and the substrates are then contacted with one another under conditions sufficient to cure the epoxy, to achieve bonding of the substrates. Generally, depending on the particular epoxy employed, "conditions sufficient to cure the epoxy" means heating the contacted substrates at a temperature between 100° F. and 350° F., preferably between 200° F. and 300° F., for periods ranging from minutes to hours, the optimum period and curing temperature easily being determined by means of trial runs. Curing can be staged as by conducting a relatively low temperature cure followed by a higher temperature post-cure.

EXAMPLES

The following Examples serve to give specific illustrations of the practice of this invention but they are not intended in any way to limit the scope of this invention.

The adhesive ability of Lord Fusor ® 310 was tested on substrate samples having the SMC formulations given in Table 1 below.

TABLE I

| SMC FORMULATIONS[1] | |
|---|---|
| USS-13031 | 50 |
| PBQ, ppm | (400) |
| NEULON-T | 37 |
| Styrene | 13 |
| Water | 0.12% |
| t-butylperbenzoate | 1.5 |
| VR-3 | 3 |
| Zinc stearate | 1 |
| Snowflake | 220 |
| B Side | 13[2] |
| Glass - 1 in., % | 26.2 |
| OCF-951 | |

[1]Formulation is in parts by weight unless otherwise indicated.
[2]20% USS-17089; 20% LP-90; 47.5% Snowflake; 10.0% CaO; 2.5% PDI-1803.

In the above:

USS-13031 is a phthalic anhydride modified maleic anhydride-propylene glycol based polyester resin containing about 38 weight percent styrene monomer supplied by USS Chemicals.

NEULON-T is a styrene solution of a modified poly(vinyl acetate) low profile additive supplied by Union Carbide Corporation.

PBQ is a parabenzoquinone inhibitor which inhibits the radical curing reaction and gives the SMC formulation time to flow in the mold.

VR-3 is a viscosity reducing agent, available from Union Carbide Corporation, which is employed to promote wetting of the glass fibers in the SMC formulation.

Zinc stearate is employed as a mold release agent.

SNOWFLAKE (Thompson Weinman) is a calcium carbonate filler.

USS-17089 is an unsaturated polyester resin vehicle designed not to react with thickening agents, available from USS Chemicals.

LP-90 a 40% solids solution of poly(vinyl acetate) in styrene supplied by Union Carbide Corporation.

CaO is a chemical thickening agent.

The substrate samples were 4 in. × 4 in. and 2 in. × 4 inch strips which had been cut from an SMC panel 100–150 mils thick. The test was run on untreated samples, i.e. to which no latex was applied (control $A_1$ and $A_2$) and samples which had been wiped with a selected primer (Samples 1 to 13). The solvent was allowed to evaporate from the primer prior to adhesive application. In the case of the latexes an air dry time of 1½ to 3 minutes was used. Primers tested included the following Union Carbide Corporation products: A-187 epoxy silane; A-1100 amino silane, Flexol EP-8 epoxide, Latex 163, 879 and 872. The modified epoxy resin and modified aliphatic amine base components of Fusor®310 were mixed in a 1.0/1.15 ratio as per the manufacturer's recommendations and applied to the SMC strips, following priming, at a thickness of approximately 30 mils. The two strips were placed together, heated in a 290° F. circulating oven for 15 minutes and cooled to room temperature.

Samples 9 to 13, after curing at 290° F. and cooling to room temperature, were post-cured in a 350° F. circulating air oven for 30 minutes in order to simulate the higher temperatures of an electrocoating paint process. Following curing or post-curing the samples were clamped to a laboratory bench and pried apart with a crowbar. The separated panels were examined and the percent fiber tear estimated. Fiber tear of 100 percent indicates that the adhesive was stronger than the substrate and that optimum bonding had been achieved.

The results of the test are given in Table II below.

TABLE II

| Example | Primer | Percent Fiber Tear |
|---|---|---|
| Control A$_1$ | None | 5 |
| Control A$_2$ | None | 30–40 |
| 1. Comparative Example | 5% A-187 in CH$_2$Cl$_2$ | 20 |
| 2. Comparative Example | 5% A-187 in CH$_2$Cl$_2$ | <5 |
| 3. Comparative Example | 5% A-1100 in CH$_2$Cl$_2$ | 90 |
| 4. Comparative Example | 5% A-1100 in CH$_2$Cl$_2$ | 5 |
| 5. Comparative Example | 50% Flexol EP-8 in CH$_2$Cl$_2$ | 30–35 |
| 6. | latex 163 | 100 |
| 7. | latex 163 | 100 |
| 8. | latex 879 | 100 |
| 9.* | latex 163 | 100 |
| 10.* | latex 163 | 100 |
| 11.* | latex 872 | 100 |
| 12.* | latex 872 | 100 |
| 13.* | latex 879 | 95 |

*Indicates that samples were post cured at temperatures of 350° C.

It is noted that considerably improved results in Percent Fiber Tear were sometimes obtained for the Controls and Comparative Examples if the test strips were clamped together (as by using C-clamps) prior to curing the epoxy adhesive. The Percent Fiber Tear numbers which appear in TABLE II are only for unclamped samples since, in industrial practice, SMC pieces are generally not clamped prior to being bonded together to form the SMC part.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A process of bonding shaped fiber reinforced polymer substrates together, comprising:
   applying a self-crosslinkable acrylic polymer latex primer to the bonding surface of each of said substrates and allowing said primer to dry,
   applying an epoxy adhesive, in an amount sufficient to effect adhesion, to the bonding surfaces thus primed, and
   contacting the bonding surfaces thus primed and epoxied with one another, under conditions sufficient to cure the epoxy, to achieve bonding.

2. A process as defined in claim 1, wherein said latex primer has a solids content of from about 40 to about 60 volume percent in a water base.

3. A process as defined in claim 2, wherein said latex primer is an acrylate/acrylonitrile copolymer.

4. A process as defined in claim 1, wherein said latex primer is applied to said bonding surfaces in a thickness less than about 15.0 mils and is permitted to dry for a minimum of from about 1 to about 5 minutes prior to adhesive application.

5. A process as defined in claim 4, wherein said thickness is less than about 10.0 mils.

6. A process as defined in claim 5, wherein said thickness is between about 0.25 and about 5.0 mils.

7. A process as defined in claim 1, wherein said epoxy adhesive is capable of withstanding exposure to a temperature of at least about 350° F.

8. A process as defined in claim 7, wherein the epoxy adhesive is derived from the reaction of a diepoxide with a polyamine hardener.

9. A process as defined in claim 8, wherein said diepoxide is derived from the reaction of bisphenol-A with epichlorohydrin.

10. The method of claim 1, wherein said substrates comprise an SMC skin and an SMC reinforcing member.

11. The method of claim 10, wherein said skin and reinforcing member are bonded to form an automobile part.

12. An article of manufacture, comprising at least two shaped fiber reinforced substrates having bonded surfaces with a self-crosslinking acrylic polymer latex primer applied thereon, said substrates being bonded together by applying an epoxy adhesive to said primed bonding surfaces and contacting the surfaces thus primed and epoxied, under conditions sufficient to cure the epoxy, to effect bonding.

13. An article as defined in claim 12, wherein said latex primer has a solids content of from about 40 to 60 volume percent in a water base.

14. An article as defined in claim 13, wherein said latex primer is an acrylate/acrylonitrile copolymer.

15. An article as defined in claim 12, wherein said latex primer is applied to said bonding surfaces in a thickness less than about 15.0 mils and is permitted to dry for a minimum of from about 1 to about 5 minutes prior to adhesive application.

16. An article as defined in claim 15, wherein said thickness is less than about 10.0 mils.

17. An article as defined in claim 16, wherein said thickness is between about 0.25 and about 5.0 mils.

18. An article as defined in claim 12, wherein said epoxy adhesive is capable of withstanding exposure to a temperature of at least about 350° F.

19. An article as defined in claim 12, wherein the epoxy adhesive is derived from the reaction of a diepoxide with a polyamine hardener.

20. An article as defined in claim 19, wherein said diepoxide is derived from the reaction of bisphenol-A with epichlorohydrin.

21. An article as defined in claim 12, wherein said substrates comprise an SMC skin and an SMC reinforcing member.

22. An article as defined in claim 21, wherein said skin and reinforcing member are bonded to form an automobile part.

* * * * *